United States Patent
Gan et al.

(10) Patent No.: US 9,965,475 B2
(45) Date of Patent: May 8, 2018

(54) USER INTERFACE FOR NAVIGATING COMMENTS ASSOCIATED WITH COLLABORATIVELY EDITED ELECTRONIC DOCUMENTS

(71) Applicant: Microsoft Technology Licensing, LLC, Redmond, WA (US)

(72) Inventors: Patrick Gan, Salem, MA (US); Erin O'Connell, North Reading, MA (US); Benjamin Wilde, Quincy, MA (US); Joan Weaver, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/088,065

(22) Filed: Mar. 31, 2016

(65) Prior Publication Data

US 2017/0286416 A1 Oct. 5, 2017

(51) Int. Cl.
*G06F 17/20* (2006.01)
*G06F 17/30* (2006.01)
*G06F 3/0482* (2013.01)
*G06F 17/24* (2006.01)
*G06F 17/22* (2006.01)

(52) U.S. Cl.
CPC ...... *G06F 17/30011* (2013.01); *G06F 3/0482* (2013.01); *G06F 17/2229* (2013.01); *G06F 17/241* (2013.01); *G06F 17/30165* (2013.01)

(58) Field of Classification Search
CPC .......................... G06F 17/241; G06F 3/04817
See application file for complete search history.

(56) References Cited

U.S. PATENT DOCUMENTS

| | | |
|---|---|---|
| 5,671,428 A | 9/1997 | Muranaga et al. |
| 6,266,683 B1 | 7/2001 | Yehuda et al. |
| 6,865,713 B1 | 3/2005 | Bates et al. |
| 7,194,679 B1 | 3/2007 | Green |
| 8,291,014 B2 | 10/2012 | Cierniak et al. |
| 8,656,266 B2 | 2/2014 | Cierniak |

(Continued)

OTHER PUBLICATIONS

Wyatt, Allen, "Jumping to a Comment", Published on: Jun. 6, 2011 Available at: http://word.tips.net/T001808_Jumping_To_a_Comment.html.

(Continued)

*Primary Examiner* — Keith D Bloomquist
(74) *Attorney, Agent, or Firm* — Patent GC LLC

(57) ABSTRACT

An end user application running on a local client computer is configured to store a collection of comment data for the electronic document. The comment data includes data representing a plurality of comment threads. Displays of comment data also include hints providing information about the content and context of previous and next comments outside of the currently viewed context of the document. When hints are used in combination with filtering of the comment data, a user can more quickly review comments based on a variety of filtering criteria. A comment map also can be provided as a spatial representation of the distribution of comments within a document. Such a comment map can be provided as a navigational aid for viewing the electronic document and reviewing comments. The comment map provides an additional way for a reviewer to quickly identify areas of a document which may require more review.

20 Claims, 10 Drawing Sheets

(56) References Cited

U.S. PATENT DOCUMENTS

| | | | |
|---|---|---|---|
| 8,745,506 | B2 | 6/2014 | Choudhary et al. |
| 8,996,621 | B2 | 3/2015 | Kleppner |
| 9,063,637 | B2 | 6/2015 | Lisse et al. |
| 9,064,237 | B2 | 6/2015 | Simons et al. |
| 9,087,032 | B1* | 7/2015 | Killalea ............... G06F 17/241 |
| 2006/0277523 | A1 | 12/2006 | Horen et al. |
| 2009/0100023 | A1 | 4/2009 | Inoue |
| 2009/0254529 | A1 | 10/2009 | Goldentouch |
| 2012/0036423 | A1* | 2/2012 | Haynes, II ........... G06F 17/241 715/230 |
| 2012/0166453 | A1 | 6/2012 | Broder |
| 2012/0192118 | A1* | 7/2012 | Migos .................. G06F 1/1626 715/863 |
| 2012/0317239 | A1 | 12/2012 | Mulder et al. |
| 2013/0132455 | A1* | 5/2013 | Mangini ............... G06Q 10/10 709/201 |
| 2013/0212059 | A1 | 8/2013 | Ameri-Yahia et al. |
| 2015/0178259 | A1 | 6/2015 | Davis et al. |
| 2015/0286624 | A1 | 10/2015 | Simons et al. |

OTHER PUBLICATIONS

Lanfranchi, et al., "Semantic Web-Based Document: Editing and Browsing in AktiveDoc", In Proceedings of Second European Semantic Web Conference on the Semantic Web: Research and Applications, May 29, 2005, 11 pages.

"International Search Report and Written Opinion Issued in PCT Application No. PCT/US2017/024386", dated Jul. 14, 2017, 13 Pages.

* cited by examiner

USER INTERFACE FOR NAVIGATING
COMMENTS ASSOCIATED WITH
COLLABORATIVELY EDITED ELECTRONIC
DOCUMENTS

BACKGROUND

The availability of shared storage systems for electronic documents has increased the ability of computer end users to share and to collaborate in the creation of a variety of electronic documents. End users can cause electronic documents to be stored in shared storage systems on a computer network, such as the internet. End users can instruct such a shared storage system to allow electronic documents to be shared with other end users of the shared storage system. A shared storage system generally has an access control component in a file system that tracks, for each electronic document, the access rights that different end users have for the electronic document.

After an electronic document has been shared among two or more end users, the shared storage system manages access to the shared electronic document to ensure consistency of the electronic document, especially in the case of collaborative editing of, i.e., collaborative modifications to, the electronic document. A collaboration system manages collaborative modification by tracking which end users currently are using end user applications on client computers to access the same electronic document. The collaboration system typically is implemented as one or more computer programs executing on the server computer, and, in some implementations, may have components executing on the client computers.

An end user application running on a computer, for the purpose of modifying electronic documents, typically is configured to allow an editor to associate a comment with a location within the electronic document. Any single editor may add multiple comments to an electronic document. When the electronic document is shared, such comments can originate from multiple editors using multiple end user applications. As an electronic document has a larger number of comments from a larger number of users, navigation among comments within a user interface can be unwieldy.

SUMMARY

This Summary is provided to introduce a selection of concepts in a simplified form that are further described below in the Detailed Description. This Summary is intended neither to identify key or essential features, nor to limit the scope, of the claimed subject matter.

In a collaboratively edited electronic document, it is common for comments to be spread throughout the electronic document. As a user views the electronic document, whether in a read-only mode or for further editing, the user typically reviews both the content of the electronic document and any associated comments. The comments typically are presented in context, in a variety of ways, with the content to which the comments are related. With comments distributed throughout the electronic document, navigation of comments, such as to ensure that the user has reviewed all of the comments, can be burdensome on the user. In particular, if the electronic document is large, a user may wish to view only those areas where there are relevant comments and to know where the relevant comments are in the electronic document.

Thus, an end user application running on a local client computer is configured to store a collection of comment data for the electronic document. The comment data includes data representing a plurality of comment threads. Displays of comment data also include hints providing information about the content and context of previous and next comments outside of the currently viewed context of the document. When hints are used in combination with filtering of the comment data, a user can more quickly review comments based on a variety of filtering criteria. A comment map also can be provided as a spatial representation of the distribution of comments within a document. Such a comment map can be provided as a navigational aid for viewing the electronic document and reviewing comments. The comment map provides an additional way for a reviewer to quickly identify areas of a document which may require more review.

In the following description, reference is made to the accompanying drawings which form a part hereof, and in which are shown, by way of illustration, specific example implementations. Other implementations may be made without departing from the scope of the disclosure.

DETAILED DESCRIPTION

Figure 1:
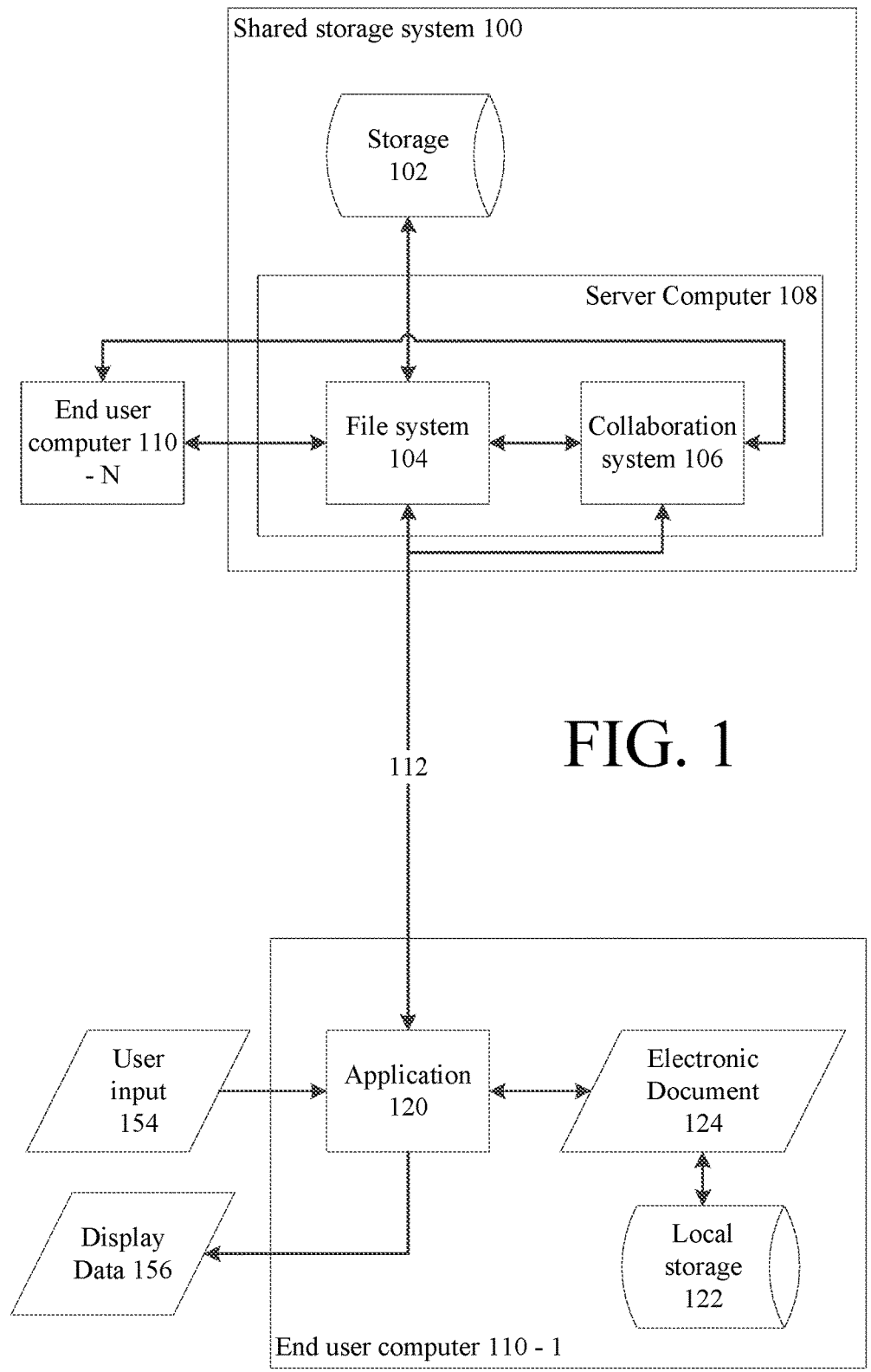
FIG. 1 is a block diagram of an example computer system configured to support collaborative editing of electronic documents through end user applications on multiple client computers.

FIG. 1 is a block diagram of an example computer system configured to support collaborative editing of electronic documents by multiple end users through end user applications on multiple client computers.

A computer system that is configured to support sharing and collaborative modification of electronic documents through multiple end user applications includes a shared storage system 100. The shared storage system 100 generally includes storage 102 in which data is stored in data files accessible through a file system 104 that is part of the shared storage system. The file system configures a server computer 108 to maintain information about each file stored in storage 102. The shared storage system 100 can be implemented using one or more general purpose computers, such as described in connection with FIG. 10, and configured to implement one or more server computers. The shared storage system 100 is responsive to requests over a computer network 112 to access, through the file system 104, files on the storage 102.

Multiple end user computers 110-1 to 110-N, also called client computers herein, are connected to the shared storage system for communication over one or more computer networks 112, such as the internet or a private computer network. An end user computer 110 can be a computer such as described in connection with FIG. 10 and configured as a client computer running one or more applications 120. Examples of such a computer include, but are not limited to, a tablet computer, a slate computer, a notebook computer, a desktop computer, a virtual desktop computer hosted on a server computer, a handheld computer, and a mobile phone including a computer and applications.

The computer network 112 can be any computer network supporting interaction between the end user computers and the shared storage system, such as a local area network or a wide area network, whether private and/or publicly accessible, and can include wired and/or wireless connectivity. The computer network can be implemented using any of a number of available network communication protocols, including but not limited to Ethernet and TCP/IP.

An end user computer 110 includes one or more applications 120. In this context, an application is a computer program executed on the end user computer that configures the computer to be responsive to user input 154 to allow an end user to interactively modify an electronic document 124. An electronic document can include any kind of data, such as text, still images, video, or audio and combinations of these, and generally has data defining structure of the electronic document and data defining content of the electronic document within the defined structure. The application processes the electronic document in response to user input received from input devices. For example, the application combines data to create the structure and content of the electronic document. The application also displays or otherwise presents display data 156, such as a graphical user interface including the content according to the structure of the electronic document, through output devices (not shown) to the end user. The application also stores the electronic document in memory and/or in a data file in local storage of the end user computer and/or in the shared storage.

A variety of kinds of applications can be used on an end user computer. Examples of an application include, but are not limited to, a word processing application, a presentation application, a note taking application, a text editing application, a paint application, an image editing application, a spreadsheet application, a desktop publishing application, a drawing application, a video editing application, and an audio editing application. An end user application can permit a variety of operations on an electronic document, such as, but not limited to, viewing and commenting without content editing, viewing and content editing, or viewing only.

An application generates an electronic document that is stored in a data file. Such a data file can be stored in local storage 122 and/or the shared storage system 100. The electronic document, while being modified by an end user on the end user computer, also is temporarily stored in memory on the end user computer. The application also may temporarily store the electronic document in a cache on local storage before committing changes to the electronic document to the data file.

For an electronic document stored in a data file in a shared storage system 100, the file system 104 of the shared storage system can include information indicating a sharing state of the electronic document. Such information can be in the form of access controls indicating which end users are authorized to access the electronic document. The file system also can be configured to be responsive to a query to provide this information to another application, such as application 120 on an end user computer. The shared storage system can provide information to an application on an end user computer about the sharing state of an electronic document, and permit modification to that sharing state, in a number of ways.

In some implementations, electronic documents can be shared by users by distributing a copy of the electronic document through various distribution channels among multiple users. Each user can modify the electronic document, possibly adding comments to the electronic document, and then can share the modified electronic document with additional users.

In some implementations, the electronic document is stored in a data file in the shared storage system 100, and the data file is shared, with modification rights, with at least one more end user. In such a case, two or more end user applications on two or more client computers can access and can attempt to modify the electronic document through the shared storage system 100. To handle such a condition, the shared storage system can include a collaboration system 106. The collaboration system 106 is a computer program that configures the server computer to manage contemporaneous access to shared electronic documents in the shared storage system 100. The collaboration system 106 is configured to store information about end user applications, and associated end users, that currently are accessing the electronic document.

Using the information about end user applications and end users currently accessing an electronic document, the collaboration system can implement any of a number of different techniques for coordinating access to the electronic document to ensure consistency of the electronic document. For example, the collaboration system can prevent one end user application from causing modifications to be written to a data file for an electronic document while another the data file is open for writing by another end user application. As another example, the collaboration system can interactively merge changes to the electronic document as such changes are being made collaboratively through multiple end user applications. In such a case, as an example, the collaboration system can merge changes received from end user computers in memory local to the collaboration system, and then can transmit a modified version of the electronic document to each end user computer with an application currently accessing the document. Such modifications can include changes to the structure and/or content of the electronic document and/or changes to comment data associated with the electronic document.

The data representing an electronic document can be stored in computer storage in a number of different formats. On the one hand, there can be a file format for one or more data files for storing data for an electronic document in persistent storage. On the other hand, there can be one or more data structures stored in memory for providing access to the data for the electronic document by an end user application during editing or viewing of the electronic document. The file format can be and typically is different from the data structure that is stored in memory, yet both store essentially the same data.

Figure 2:
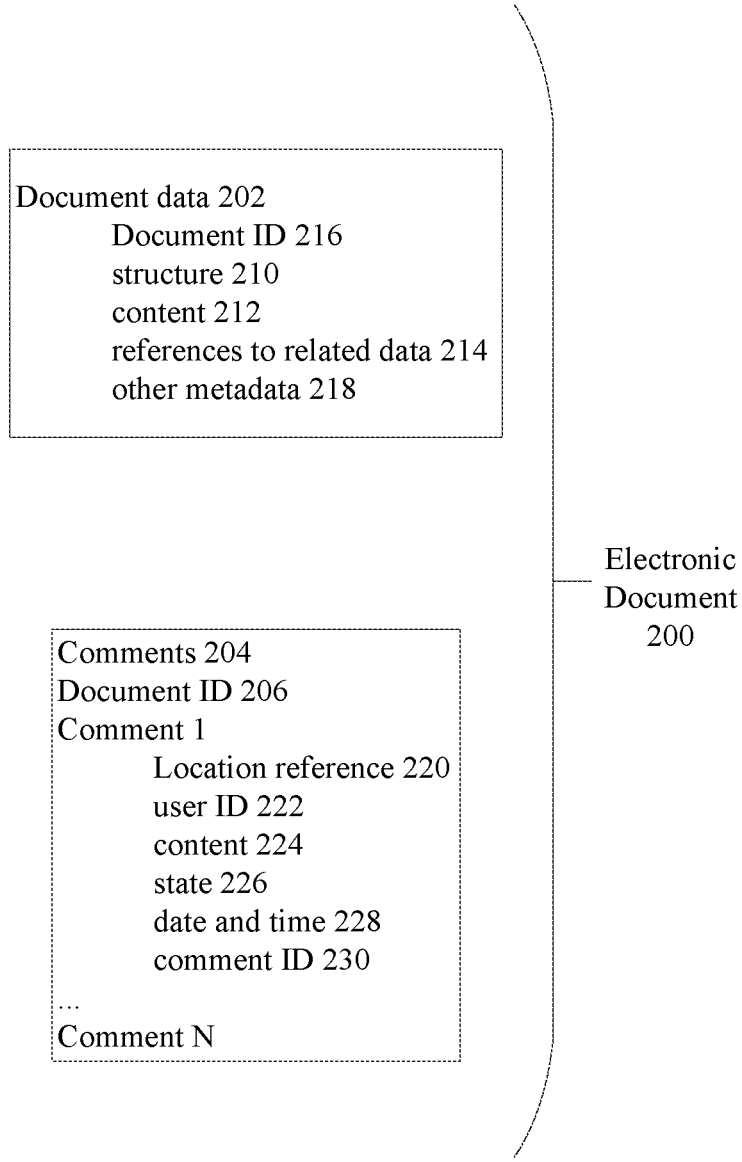
FIG. 2 is a diagram illustrating data structures for storing comment data for an electronic document.

Referring now to FIG. 2, in general, and whether in a data file in persistent storage or data structure in memory, the data 200 for the electronic document includes data representing structure and content of the document 202 and structure and content of comments 204.

With respect to an example file format, in one implementation, the data for the document 202 and data for the comments 204 can be stored in one data file. In another implementation, data for the document 202 and data for the comments 204 can be stored in separate data files. When such data is read by an end user application, the end user application may generate corresponding data structures in memory, which in turn are processed and stored into the data files at periodic intervals and/or in response to an instruction received from an end user.

Generally speaking, the data 202 for the electronic document includes a document identifier 216, data defining the structure 210 of the electronic document, and data defining the content 212 within that structure of the electronic document. There is a wide variety of formats for electronic documents, including various markup languages, such as the hypertext markup language (HTML), standard generalized markup language (SGML), extensible markup language (XML), as well as proprietary document formats. The invention is not limited to any particular format for the structure and content of the electronic document. The data for an electronic document may include references to other data related to the electronic document 214, such as files storing comment data, style sheets for formatting the document, templates, macros and the like. The data for an electronic document also may include various metadata 218 about the electronic document.

Comment data 204 defining a collection of comments can include a document identifier 206 indicating the electronic document to which the collection of comments is related. The comment data can include, for each comment, a reference 220 to a location within the electronic document, a user identifier 222 of the end user that added the comment, and content 224 of the comment, which is typically text but is not limited to text. The reference 220 to a location in a document can be, for example, an offset within the electronic document, such as an offset within the content associated with a structural element of the electronic document. The user identifier can be any indication of a user, such as an email address, user name, etc., such as the user name for the user to access the shared storage system that stores the electronic document. State information 226 also can be associated with a comment, such as data indicating whether the comment has been resolved. A comment also can have an associated date and time stamp 228 indicating when the comment was added to the electronic document. The comment can have a comment identifier 230 that distinguishes the comment from other comments associated with the electronic document.

Comments can be threaded, such that a comment refers to another comment, perhaps in the form of a reply. There are a variety of ways to implement comment threading, such as using the reference 220 of a first comment to refer to a comment identifier 230 of another comment, or using a linked list to represent a comment and any reply comments associated with it.

Figure 3:
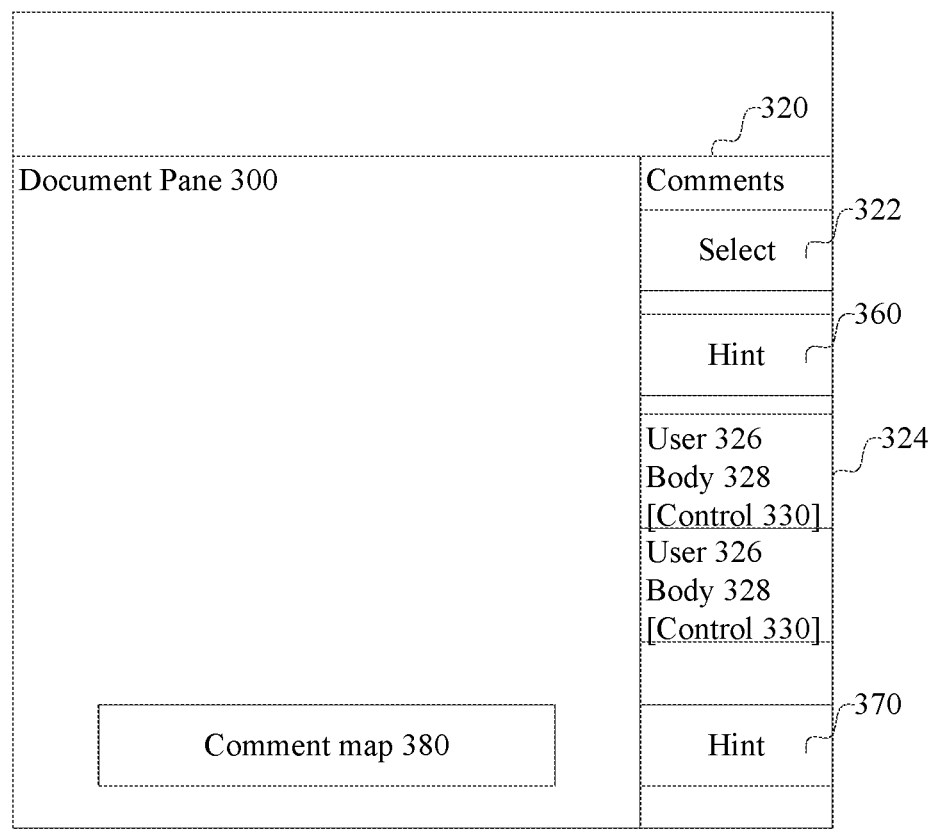
FIG. 3 is an illustration of an example graphical user interface for displaying comment data and activity data on an end user application.

In FIG. 3, an example graphical user interface for an end user application is shown. In this example graphical user interface, a document pane 300 is a primary display area in which the electronic document is presented on a display. The end user computer receives user inputs through one or more input devices, and can associate such inputs with operations with respect to the electronic document in document pane 300, or with respect to other graphical elements in the graphical user interface. The end user computer processes some user inputs to effect modifications to the structure and/or content of the electronic document currently being accessed in the document pane 300.

The graphical user interface for the end user application can include a comments pane 320 in which the end user application displays one or more comments associated with the electronic document. In response to user input, various settings can be provided that control the display of the comment data. For example, the comments pane can include a selection element 322. In response to user inputs with respect to the selection element, the end user application displays comments for the electronic document currently presented in the document pane 300. For example, the selection element 322 can provide a mechanism through which the end user application receives inputs specifying how comments are viewed in the comments pane 320. In response to selection of this control, one or more user interface elements can be used to provide for user input of a variety of settings.

For example, the end user application can have a setting for indicating whether all comments are shown or whether only open comments are shown, and whether all comments in a thread are shown or whether only the first comment is shown, or other display settings related to possible states of each comment. For example, the end user application can have a setting allowing filtering of the comments to be viewed, such as by date, by individual entering the comment, by keyword, and so on.

Generally speaking, the data displayed in the comments pane is a representation of the collection of comments, as filtered based on any user settings, typically starting with a first comment or a selected comment associated with any currently displayed portion of the document. This display can be interactively updated based on a current cursor position in the document or a currently displayed portion of the document. Generally speaking, and as described in more detail below in connection with FIG. 4, the comments shown are only those that have a status of "unresolved", unless a display setting is set otherwise to show all comments. The invention is not limited to any particular kind of display of the comment data. The display of the comment data also can be integrated with the display of the structure and content of the electronic document in the document pane.

In the comments pane, a comment is displayed by generating a graphical representation 324 of the comment including an indication 326 of the user that created the comment, which can include a name, user name and/or picture of the user, and the body 328 of the comment, which is typically text but can include other data, as well as other visual appearance parameters related to the comment. This graphical representation 324 of a comment can be generated using a variety of data accessible through the data for the comment. For example, the user identifier can be used to access profile information of the user from the shared storage system. If the comment is part of a thread of comments associated with the same location in the electronic document, the graphical representation of the comment can include an indication of a number of messages in the thread and/or graphical representations of each of the comments in the thread. Mechanisms to expand and collapse a view of a comment thread also can be provided in the end user application.

Given one or more displayed comments, the end user application is configured to be responsive to user input associated with the comments to select one or more comments, and to be responsive to user input with respect to a selected one or more comments. For example, the end user application can be responsive to user input associated with a comment to mark the comment as resolved, by setting the value associated with the comment to indicate the comment is resolved.

For example, other graphical elements in the graphical representation of the comment can include one or more controls 330, such as buttons, that allow an end user to provide input with respect to a displayed comment, such as an input to edit the comment, delete the comment, reply to the comment, mark the comment as resolved, re-open the resolved comment, show or hide the thread related to the comment, navigate to the next or previous comment, and so on. In response to manipulating such a control, the corresponding action can be taken, such as marking a comment as resolved, enabling editing of the comment, deleting the comment, adding a reply comment in the comment thread and enabling the reply, showing or hiding the comment thread, and so on.

The end user application can be programmed to provide such a comment pane to support a wide variety of operations for viewing comment data. For example, the comments can be filtered and/or sorted based on a user, keyword and/or date, or other data, and then displayed in the comment pane. A user of the application can specify how the actions displayed in the comment pane should be filtered and/or sorted. In response to such a specification, the application generates the corresponding display of comments. A scroll bar (not shown) can be provided in the comment pane to allow scrolling of the displayed comments. When the comment pane is displayed, the comment pane also can include a closing element (not shown). Manipulation of the closing element in response to user input results in the end user application closing the comment pane.

In the example shown in FIG. 3, the end user application presents the comments pane in the context of the currently accessed electronic document. In particular, in this example, the document pane 300 and comments pane 320 are displayed in the graphical user interface simultaneously. In this example in FIG. 3, the interfaces are illustrated as panes of the graphical user interface which are non-overlapping and non-modal with the other panes of the interface. The comments pane also can be implemented using other graphical user interface techniques. A modal dialog box, a call-out interface, or small pop-up window also are examples of a kind of interface that can be shown in the context of the currently accessed electronic document. Generally speaking, the comment pane is not separately scrollable and instead presents comments related to the currently displayed content of the electronic document in the document pane 300. The comment pane can be empty except for one or more hints 360, 370, to allow for navigation to the document section having the next comment. As another example, a single hint 360 can appear on the document pane 300.

To assist navigation of the document based on comments, one of the challenges for a user is understanding the context of next and previous comments related to sections of a document for which the content is not currently displayed. For example, the currently presented portion of an electronic document may have a comment associated with it, and the next or previous comment may be related to another portion of the electronic document which is not displayed. To improve the user's productivity in working with the electronic document, hints 360, 370 about the substance of the next and/or previous comments also are provided in the graphical user interface. A "hint" is a graphical representation of any next or previous comment that is related to a location in the electronic document, which location is not currently displayed. The hint is displayed in the graphical user interface and, in response to user input with respect to the hint, the application can update the display of the electronic document to show the portion of the electronic document and associated comment related to the displayed hint.

Figure 8:
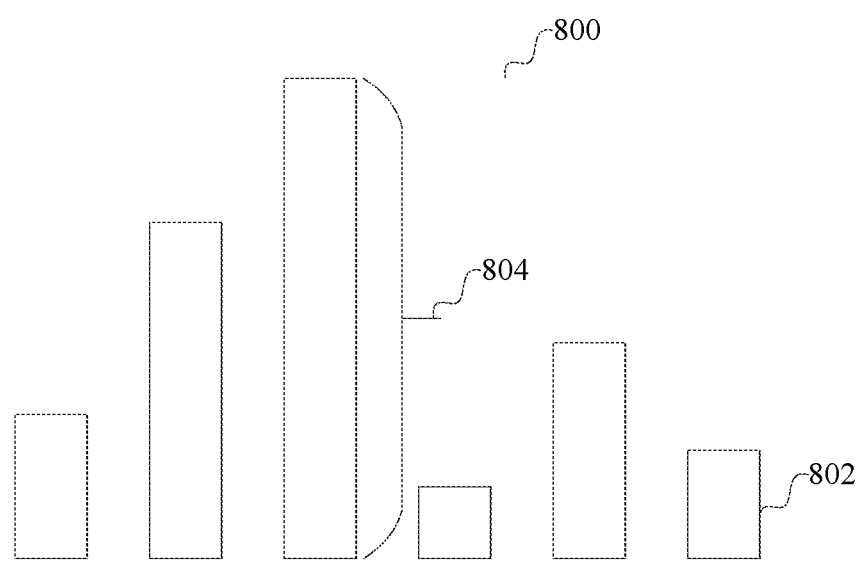
FIG. 8 is an illustration of an example graphical user interface for displaying a comment map.
Figure 9:
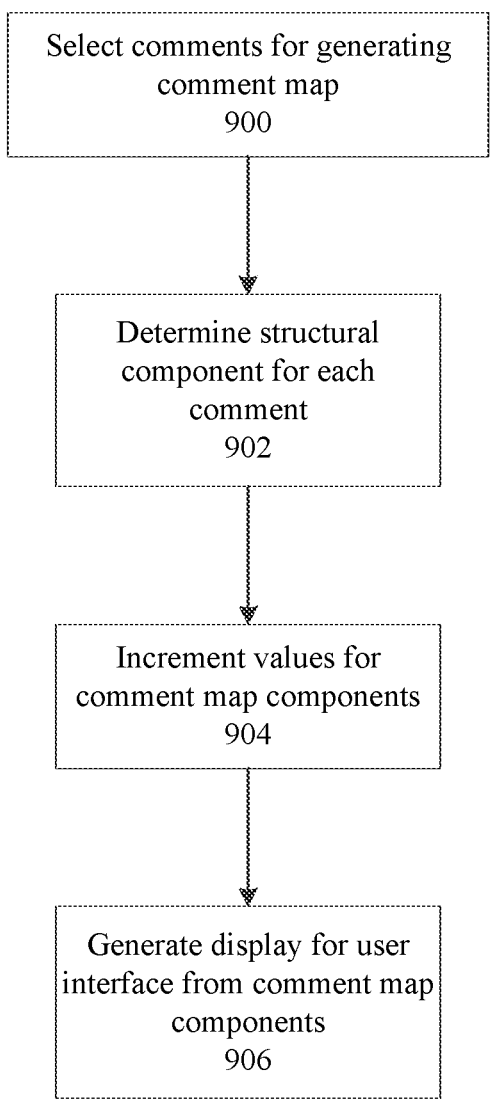
FIG. 9 is a flow chart describing an example implementation of generating a comment map.

The graphical user interface also can include a comment map 380, as described in more detail below in connection with FIGS. 8-9. Such a comment map can be displayed and controlled independently from the comment pane. In general, the comment map is a spatial representation of the document and the comments associated with the document.

Figure 4:
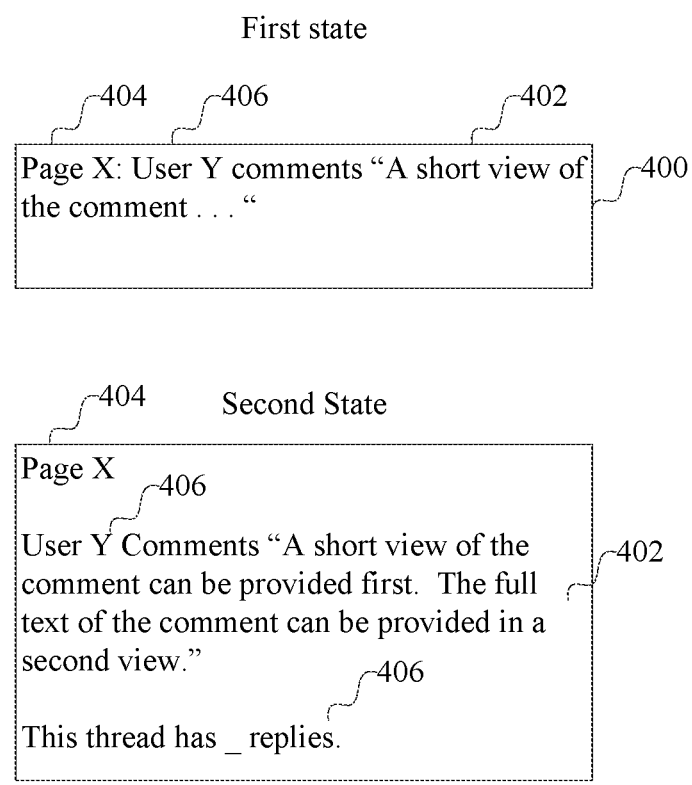
FIG. 4 is an illustration of an example graphical user interface component representing a hint.

Referring now to FIG. 4, the content of the hint can include a variety of information. In general, a hint 400 includes at least an indication of some content 402 of the comment, an indication of some context 404 of the comment. The content of the comment can include, for example, a first few words or characters from the body of the comment. The context of the comment can include, for example, a first few words or characters of content around the location to which the comment is associated, or an indication of the structure to which the comment is associated, such as a page number, slide number, sheet number, line number, section heading, track, time code, layer, and the like.

The hint also can include some metadata 406 about the comment. The metadata about a comment can include, for example, a number of comments in the comment thread, an indication of one or more authors associated with the comment or comment thread, a date and time of creation of the comment, a comment state (such as resolved or unresolved). An indication of an author can be a name or an image of the author.

A hint itself can include multiple states, based on user input associated with the hint, such as different gestures from a user using an input device. For example, with an input device such as a pointing device, e.g., a mouse, placing a cursor over the hint, commonly called a "hover" gesture, can change the display state of a hint. For example, a hint may have a first state in which a limited amount of information is shown, and then a second state in response to a hover or similar selection gesture, in which more information is shown. For example, the content 402 can include a selected number of characters of the body of the comment in the first state, and then the content 402 an include all of the body of the comment in the second state. As another example, the hint can display only content 402 and context 404 in the first state, and then add metadata 406 in the second state. As another example, the hint can display content 402 and context 404 in the first state, and then, in the second state, add displayed controls, such as buttons, or other indication that further user inputs can be received with respect to the hint. In response to additional inputs in this second state, further operations with respect to the comment, related to the hint, could be performed, such as resolving the comment, replying to the comment, deleting the comment or navigating to the portion of the document related to the comment.

Figure 5:
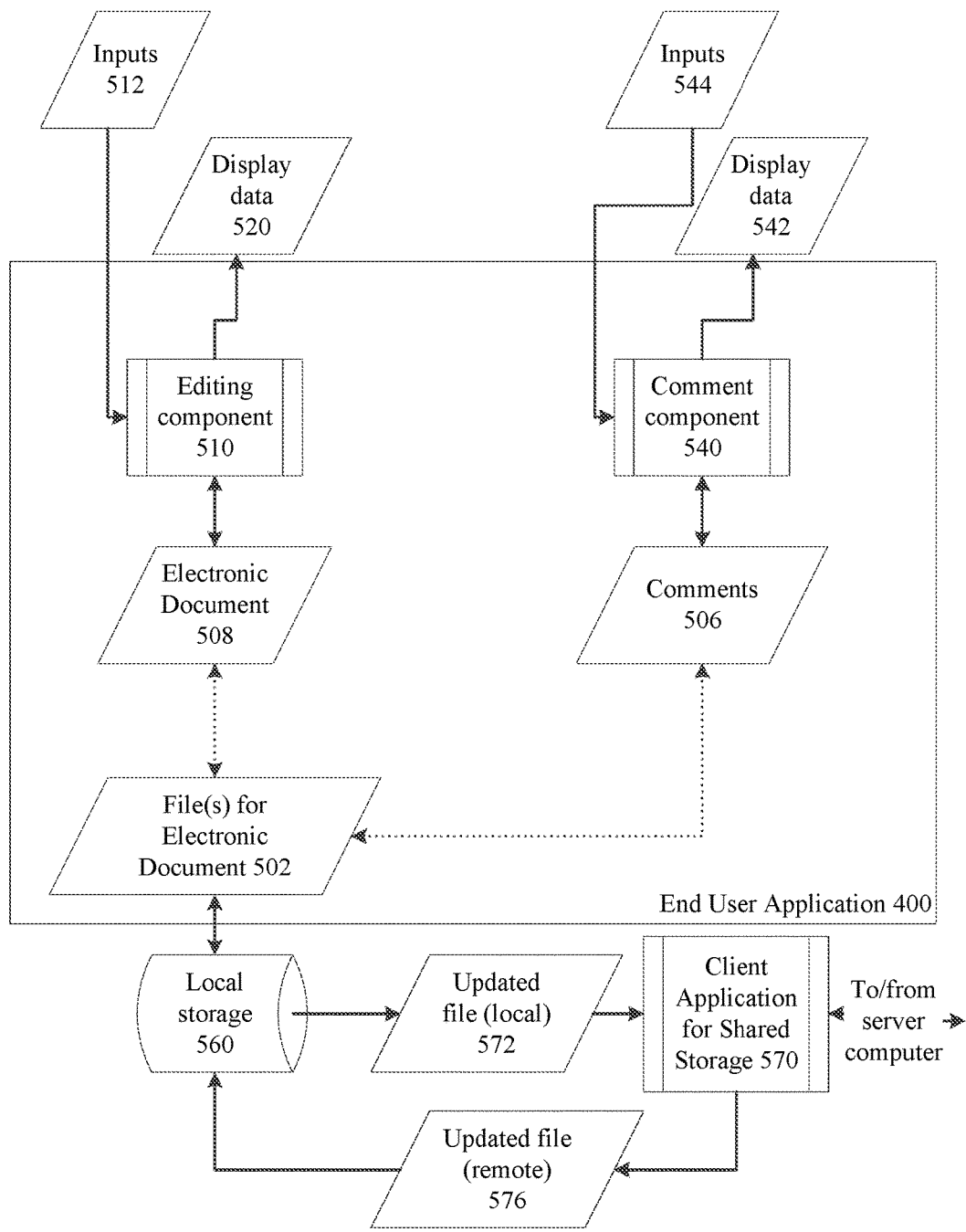
FIG. 5 is a data flow diagram of an example client computer configured to edit electronic documents with comments.

Turning now to FIG. 5, is a data flow diagram of an example implementation of an end user application 500, running on a client computer, which includes a comment pane such as shown in FIGS. 3 and 4, will now be described. More details of an example implementation of the operation of the system in FIG. 5 are provided by FIGS. 6 through 9. It should be understood that the implementation as described in connection with FIGS. 2 through 9 is merely an example implementation and that a wide variety of other implementations are possible. The end user application 500 has an input to receive one or more files 502 defining the electronic document. The end user application generates, in memory, representations of a collection of comments 506 based on the received one or more files.

The files 502 may be received from local storage 560 and/or from a shared storage system (such as 100 in FIG. 1). In many shared storage systems, the files in local storage 560 are synchronized with copies of the files on a server computer in the shared storage system. For example, the end user computer can include a client application 570 for shared storage that periodically transmits an updated file 572 of the electronic document from the local storage 560 to the server computer. The server computer then transmits a copy of the electronic document received from one client computer to the other client computers that are using that electronic document. The client application 570 for the shared storage receives an updated file 576 of the electronic document from the server computer, and then updates the copy in local storage 560.

The end user application also processes the structure and content of the electronic document into memory to generate a representation of the electronic document 508, which is edited through an editing component 510. The editing component has inputs to receive user and system inputs 512 involved in the editing and storing of the electronic document, and outputs to provide display data 520 representing the electronic document being edited, and outputs to provide a modified electronic document back to storage as a file 502 upon saving. The end user application displays the display data 520 through a graphical user interface, which can include one or more displays and/or other output devices.

A comment component 540 manages interaction with the collection of comments 506. For example, the comment component generates display data 542 for a comment pane to be displayed in the graphical user interface 516 using the collection of comments 506, as described in more detail in connection with FIGS. 6 through 7 below. Also, the comment component is responsive to user actions 544, such as adding a comment, deleting a comment, editing a comment, replying to a comment and resolving a comment, to update the data in the collection of comments 506. The comment component also can interactively update the display of the comments in response to updates to the data in the collection of comments. For example, the comments component is responsive to an input marking a selected comment as resolved, so as to update the data in the collection of comments to mark the comment as resolved and update the comments display. The comment component also can interactively update the display of comments.

Figure 6:
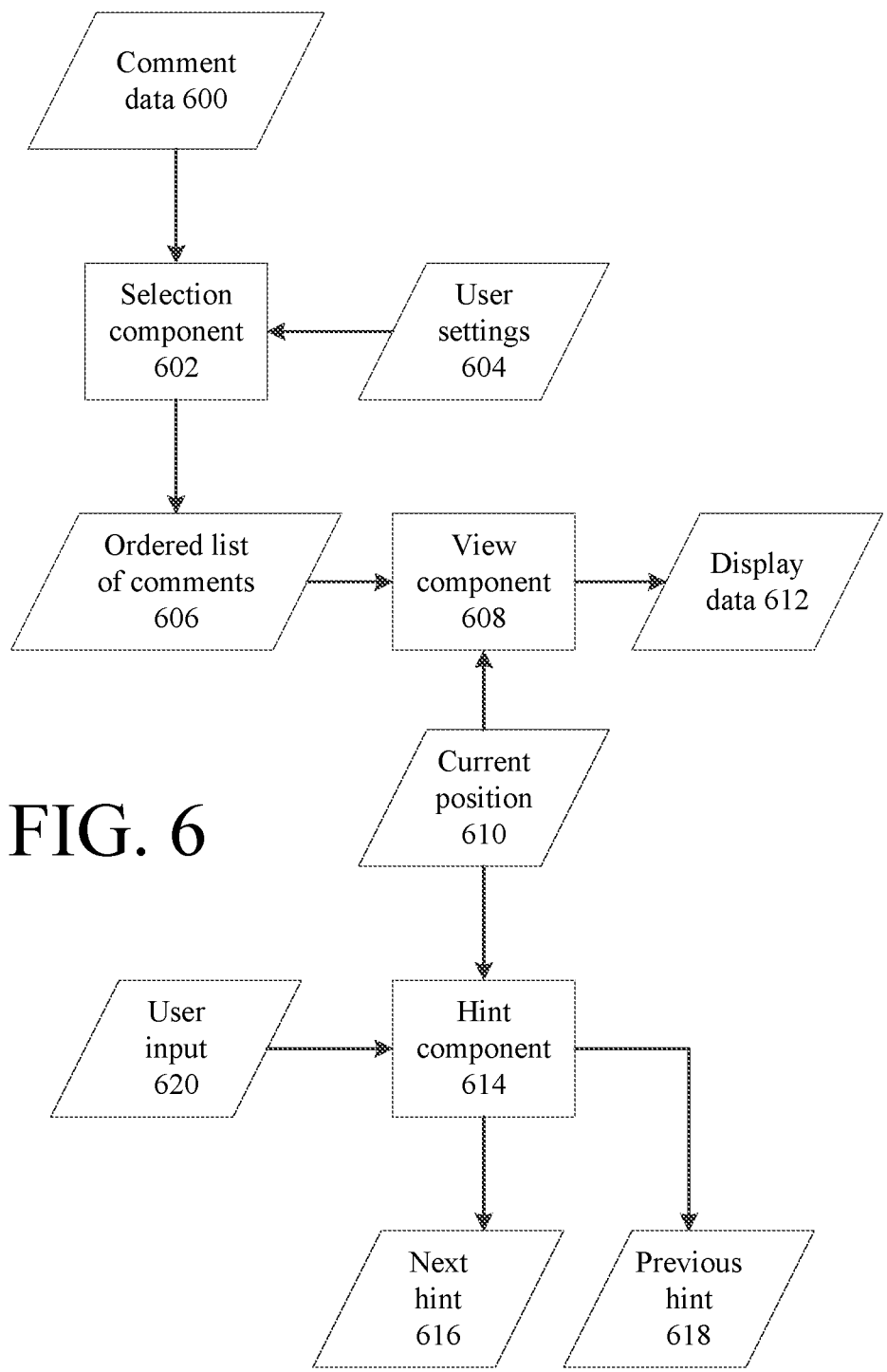
FIG. 6 is a data flow diagram of an example implementation of a comment component.

An example implementation of the display operation of the comment component will now be described in connection with the data flow diagram of FIG. 6. Comment data 600 is processed by a filtering or selection component 602 according to various user settings 604 to output an ordered list of comments 606, based on the locations in the document to which the selected comments refer. The list of comments 606 to be displayed is processed by a comment view component 608, optionally based on a current position 610 in the electronic document that is currently displayed. Generally speaking, the comment view component generates display data 612 to be displayed in association with the currently displayed content of the electronic document. The current position 610 in the document also is provided to a hint component 614, which accesses the list of comments 606 to generate a hint 616 for the next comment outside of the current view of the document, and a hint 618 for the previous comment outside of the current view of the document. The hint component also can be responsive to user input 620, which can change, for example, a state for displayed hints and thus change the display data 616 or 618 produced for the hint. The hint 616, hint 618 and display data 612 are the displayed comment data provided by the comment component.

Figure 7:
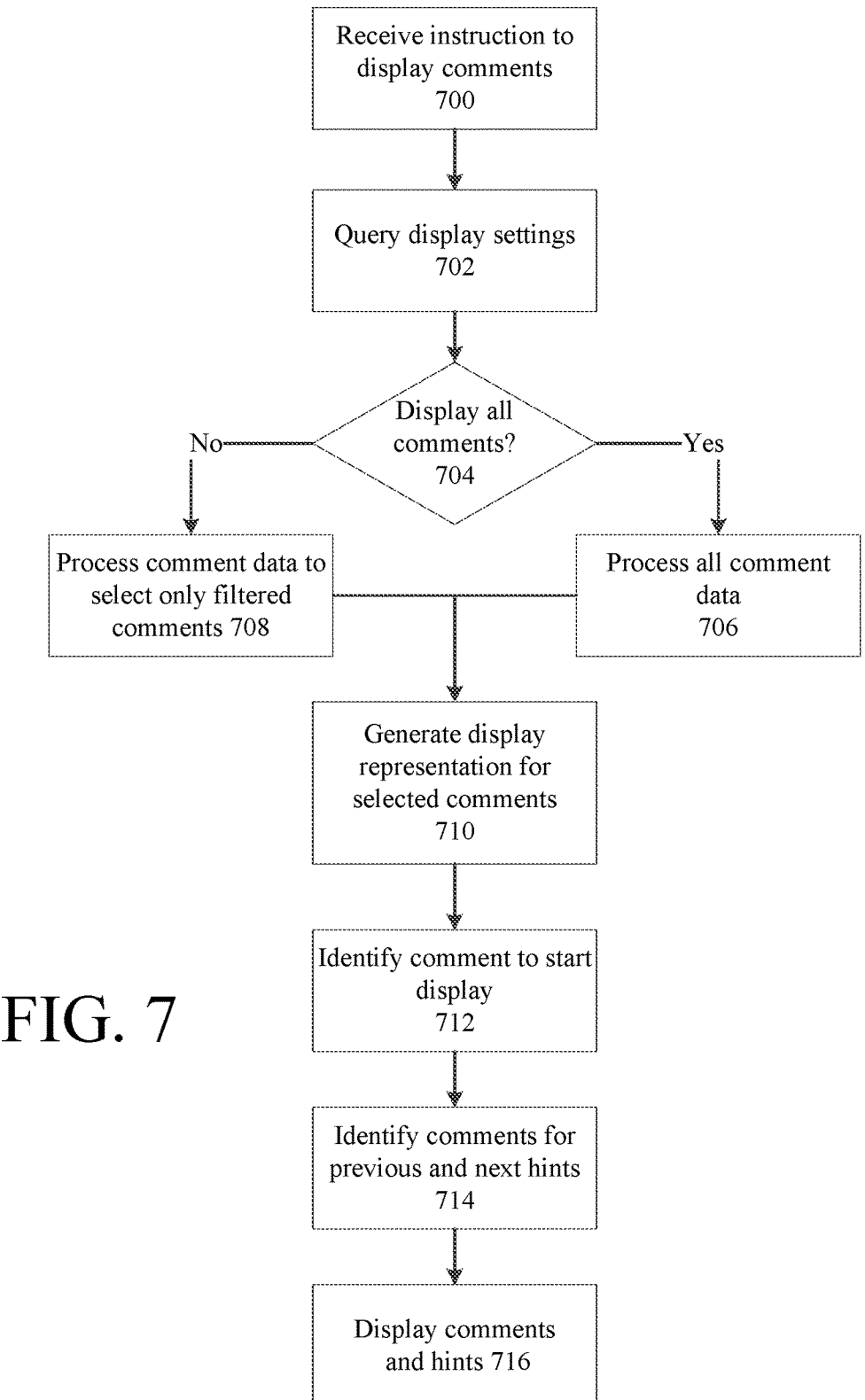
FIG. 7 is a flow chart describing an example implementation of an operation for generating and displaying a comments pane with hints.

Turning now to FIG. 7, a flowchart describing an example implementation of an operation for generating and displaying a comments pane will now be described. This operation is described in the context of a collection of comments associated with a document and displayed in a comment pane such as in FIG. 3. This implementation is merely an example; there are other ways in which a collection of comments can be displayed in association with an electronic document.

The end user application receives 700 an instruction to display the comments. The end user application queries 702 display settings for the comment pane. Such display settings can include any of a variety of settings, such as whether all comments in a thread should be displayed and whether all comments should be displayed, and formatting information for displaying the comments, such as font type and size, color, backgrounds, and the like.

If all comments should be displayed, as determined at 704, the end user application processes 706 the comment data so as to select and sort all comments in order by their corresponding positions in the electronic document, and by order within any comment thread. Otherwise, if only a subset of the comments should be displayed based on one or more filters, as determined at 704, the end user application processes 708 the comment data so as to select and sort only unresolved comments in order by their corresponding positions in the electronic document, and by order within any comment thread.

For each comment to be displayed, the end user application can generate 710 a display representation of the comment. The display representation of a comment can include, among other things, a control for marking the comment as resolved. The end user application then can identify 712 a comment, among those to be displayed, which corresponds to the currently displayed portion of the electronic document. Additionally, comments to provide the previous hint and next hint are identified 714. Display 716 of the comments can begin with the identified comment, with hints displayed, for example at the beginning and end of the region in which the selected comments are displayed.

An additional component of the graphical user interface than can be generated by the comment component is the comment map (e.g., 380 in FIG. 3). An example of such a map is shown in FIG. 8 as a histogram 800. The histogram 800 is a graphical representation of an array of data generated for an electronic document. Each element of the array, and thus each component 802 of the histogram, corresponds to a structural component of the electronic document, such as each paragraph, page, sheet slide, track or the like. Another visual characteristic of the component, such as its height 804, represents a value associated with that structural component, which value is representative of the number of comments or comment threads associated with that component. The map can be based on all comments or a subset of comments based on some filtering criteria. In response to a user input associated with a component of the comment map, the end user application can, for example, cause the view of the document to be navigated to the content corresponding to the structural component represented by the comment map component. As another example operation, in response to user input hints derived from the associated components can be generated and displayed. As another example operation, in response to user input, representations of the comments can be displayed.

A flowchart for generating such a comment map will now be described in connection with FIG. 9. The process begins with selecting 900 the comment data to be used to generate the comment map. The comment data can be all of the comments for the electronic document, or some filtered subset of the comments, such as only unresolved comments, comments from a selected user, or other filtered subset. Using the location reference data (e.g., 220 in FIG. 2) for each comment, the structural component of the document that contains the comment is determined 902. The values for the comment map components corresponding to the structural components are incremented 904 based on step 902. The display data for the comment map is then produced 906 based on the values for the comment map components.

By providing hints in the display of comment data associated with an electronic document, a user can reduce the amount of time involved in reviewing comments of a document. When hints are used in combination with filtering of the comment data, a user can more quickly review comments based on a variety of filtering criteria. A comment map provides an additional way for a reviewer to quickly identify areas of a document which may require more review.

Figure 10:
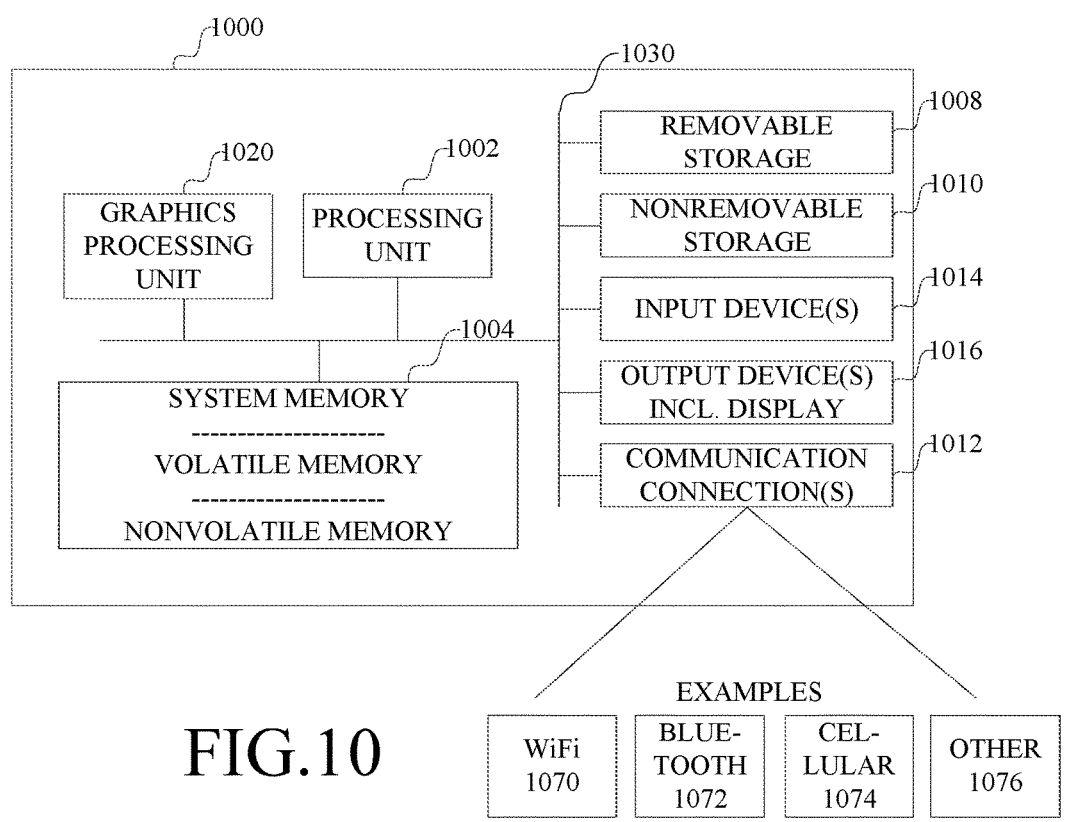
FIG. 10 is a block diagram of an example computer.

Having now described an example implementation, FIG. 10 illustrates an example of a computer with which such techniques can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 10, a computer 1000 includes at least one processing unit 1002 and memory 1004. The computer can have multiple processing units 1002 and multiple devices implementing the memory 1004. A processing unit 1002 can include one or more processing cores (not shown) that operate independently of each other. Additional co-processing units also can be present in the computer. The memory 1004 may include volatile devices (such as dynamic random access memory (DRAM) or other random access memory device), and non-volatile devices (such as a read-only memory, flash memory, and the like) or some combination of the two. Other storage, such as dedicated memory or registers, also can be present in the one or more processors. The computer 1000 can include additional storage, such as storage devices (whether removable or non-removable) including, but not limited to, magnetically-recorded or optically-recorded disks or tape. Such additional storage is illustrated in FIG. 10 by removable storage device 1008 and non-removable storage device 1010. The various components in FIG. 10 are generally interconnected by an interconnection mechanism, such as one or more buses 1030.

A computer storage medium is any medium in which data can be stored in and retrieved from addressed physical storage locations by the computer. A computer storage medium thus can be a volatile or nonvolatile memory, or a removable or non-removable storage device. Memory 1004, removable storage 1008 and non-removable storage 1010 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 1000 may also include communications connection(s) 1012 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 1012 are devices, such as a wired network interface, wireless network interface, radio frequency transceiver, e.g., WiFi 1070, cellular 1074, long term evolution (LTE) or Bluetooth 1072, etc., transceivers, navigation transceivers, e.g., global positioning system (GPS) or Global Navigation Satellite System (GLONASS), etc., or other devices 1076 that interface with communication media to transmit data over and receive data from the communication media.

The computer 1000 may have various input device(s) 1014 such as a pointer device, keyboard, touch-based input device, pen, camera, microphone, sensors, such as accelerometers, thermometers, light sensors and the like, and so on. The computer 1000 may have various output device(s) 1016 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 1010, communication connections 1012, output devices 1016 and input devices 1014 can be integrated within a housing with the rest of the computer, or can be connected through various input/output interface devices on the computer, in which case the reference numbers 1010, 1012, 1014 and 1016 can indicate either the interface for connection to a device or the device itself as the case may be.

A computer generally includes an operating system, which is a computer program that manages access to the various resources of the computer by applications. There may be multiple applications. The various resources include the memory, storage, input devices and output devices, such as display devices and input devices as shown in FIG. 10.

The various modules, data structures and flowcharts of FIGS. 1-9 as well as any operating system, file system and applications on a computer in FIG. 10, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer includes a network interface configured to connect the computer to a computer network, the computer network being connected to a shared storage system, the shared storage system comprising a file system configured to store a plurality of electronic documents and to make the plurality of electronic documents available to a plurality of users. The computer also includes a processing system comprising one or more processing units and storage, the storage comprising computer program code. When executed by the processing system, the computer program code configures the processing system to comprise an application configured to process user input to modify an electronic document, the application comprising a graphical user interface including a document pane configured to display the electronic document, and comments displayed in association with the electronic document, wherein comments have at least context data and content data. The application is further configured to, in response to a currently viewed portion of the electronic document, determine a next comment or previous comment outside of the currently viewed portion, and to generate and display a hint based on at least context data and content data of the determined content. The application is further configured to, in response to an input associated with a displayed hint, navigate to viewing a portion of the electronic document associated with the comment related to the displayed hint.

In another aspect a computer-implemented process comprises processing user input to modify an electronic document, including presenting a graphical user interface including a document pane configured to display the electronic document and including displayed comments associated with the electronic document, wherein comments have at least context data and content data. In response to a currently viewed portion of the electronic document, a next comment or previous comment outside of the currently viewed portion is determined, and a hint is generated and displayed based on at least context data and content data of the determined content. In response to an input associated with a displayed hint, the process then involves navigating to viewing a portion of the electronic document associated with the comment related to the displayed hint.

In another aspect, a computer comprises means for generating a graphical user interface including a document pane configured to display the electronic document, and comments displayed in association with the electronic document, wherein comments have at least context data and content data. The computer further comprises means, operative in response to a currently viewed portion of the electronic document, for determining a next comment or previous comment outside of the currently viewed portion, and for generating and displaying a hint based on at least context data and content data of the determined content. The computer further comprises means, operative in response to an input associated with a displayed hint, for navigating to viewing a portion of the electronic document associated with the comment related to the displayed hint.

In another aspect, a graphical user interface of an application for a computer comprises a document pane configured to display the electronic document, and comments displayed in association with the electronic document, wherein comments have at least context data and content data. The graphical user interface presents a hint based on context data and content data of a next comment or previous comment outside of a portion of the electronic document currently presented in the document pane. In response to an input associated with a displayed hint, the graphical user interface changes the portion of the electronic document currently presented in the document pane to include content associated with the comment corresponding to the displayed hint.

In any of the foregoing aspects, the application can be configured to display only comments selected according to filter criteria.

In any of the foregoing aspects, the application can be configured to generate a comment map providing a spatial representation of distribution of selected comments for the electronic document.

In any of the foregoing aspects with a comment map, the application can be configured to, in response to user input with respect to the comment map, navigate to a portion of the electronic document according to the user input.

In any of the foregoing aspects with a comment map, the application can be configured, in response to user input associated with the comment map, to display a hint related to comment based on the input associated with the comment map.

In any of the foregoing aspects, the displayed hint can have a first state, and, in response to user input with respect to the displayed hint, the application can generate and display the hint in a second state.

In any of the foregoing aspects, comment data can further include metadata for a comment and a displayed hint further includes data indicative of the metadata for the comment.

In another aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer, comprising:
   a network interface configured to connect the computer to a computer network, the computer network being connected to a shared storage system, the shared storage system comprising a file system configured to store a plurality of electronic documents and to make the plurality of electronic documents available to a plurality of users for modification of structure and content of the electronic documents; and
   a processing system comprising one or more processing units and storage, the storage comprising computer program code that, when executed by the processing system, configures the processing system to comprise:
   an application configured to process user input to modify structure and content of an electronic document and associate comments with the content of the electronic document, the application comprising a graphical user interface including a document pane configured to display a first portion of the electronic document as a currently viewed portion of the electronic document, and wherein the graphical user interface is further configured to display comments from the plurality of users in association with the currently viewed portion of the electronic document, wherein comments have at least context data indicating a location within the electronic document and content data;
   the application configured to, based on at least the currently viewed portion of the electronic document, identify a next comment or previous comment associated with content of the electronic document outside of the currently viewed portion of the electronic document, and to generate and display, with the displayed comments in the graphical user interface, a hint comprising a graphical representation of an indication of at least context data and content data of the identified comment;
   the application configured to, in response to user input to navigate to displaying a second portion of the electronic document as the currently viewed portion of the electronic document, repeat identifying, based on at least the currently viewed portion of the electronic document, a next or previous comment with respect to the second portion of the electronic document, and generate and display a hint of the identified next or previous comment; and
   the application configured to, in response to an input associated with a displayed hint related to a comment, navigate to displaying, in the document pane, a third portion of the electronic document associated with the comment related to the displayed hint.

2. The computer of claim 1 wherein the application is configured to display only comments selected according to filter criteria.

3. The computer of claim 1 wherein the application is configured to generate a comment map providing a spatial representation of distribution of selected comments for the electronic document.

4. The computer of claim 3 wherein the application is configured to, in response to user input with respect to the comment map, navigate to a portion of the electronic document according to the user input.

5. The computer of claim 3, wherein the application is configured, in response to user input associated with the comment map, to display a hint related to comment based on the input associated with the comment map.

6. The computer of claim 1 wherein the displayed hint has a first state, and, in response to user input with respect to the displayed hint, the application generates and displays the hint in a second state.

7. The computer of claim 1 wherein comment data further includes metadata for a comment and a displayed hint further includes data indicative of the metadata for the comment.

8. An article of manufacture comprising:
   at least one computer storage medium,
   computer program instructions stored on the at least one computer storage medium which, when processed by a processing system of a computer, the processing system comprising one or more processing units and storage, configures the computer to comprise:
   a network interface configured to connect the computer to a computer network, the computer network being connected to a shared storage system, the shared storage system comprising a file system configured to store a plurality of electronic documents and to make the plurality of electronic documents available to a plurality of users for modification of structure and content of the electronic documents; and
   a processing system comprising one or more processing units and storage, the storage comprising computer program code that, when executed by the processing system, configures the processing system to comprise:
   an application configured to process user input to modify structure and content of an electronic document and associate comments with the content of the electronic document, the application comprising a graphical user interface including a document pane configured to display a first portion of the electronic document as a currently viewed portion of the electronic document, and wherein the graphical user interface is further configured to display comments from the plurality of users in association with the currently viewed portion of the electronic document, wherein comments have at least context data indicating a location within the electronic document and content data;
   the application configured to, based on at least the currently viewed portion of the electronic document, identify a next comment or previous comment associated with content of the electronic document outside of the currently viewed portion of the electronic document, and to generate and display, with the displayed comments in the graphical user interface, a hint comprising a graphical representation of an indication of at least context data and content data of the identified comment;

the application configured to, in response to user input to navigate to displaying a second portion of the electronic document as the currently viewed portion of the electronic document, repeat identifying, based on at least the currently viewed portion of the electronic document, a next or previous comment with respect to the second portion of the electronic document, and generate and display a hint of the identified next or previous comment; and the application configured to, in response to an input associated with a displayed hint related to a comment, navigate to displaying, in the document pane, a third portion of the electronic document associated with the comment related to the displayed hint.

9. The article of manufacture of claim 8 wherein the application is configured to display only comments selected according to filter criteria.

10. The article of manufacture of claim 8 wherein the application is configured to generate a comment map providing a spatial representation of distribution of selected comments for the electronic document.

11. The article of manufacture of claim 10 wherein the application is configured to, in response to user input with respect to the comment map, navigate to a portion of the electronic document according to the user input.

12. The article of manufacture of claim 10 wherein the application is configured, in response to user input associated with the comment map, to display a hint related to comment based on the input associated with the comment map.

13. The article of manufacture of claim 8 wherein the displayed hint has a first state, and, in response to user input with respect to the displayed hint, the application generates and displays the hint in a second state.

14. The article of manufacture of claim 8 wherein comment data further includes metadata for a comment and a displayed hint further includes data indicative of the metadata for the comment.

15. A computer-implemented process comprising:
processing user input to modify structure and content of an electronic document and to associated comments with the content of the electronic document, including presenting a graphical user interface including a document pane configured to display a currently viewed portion of the electronic document, wherein the graphical user interface further displays comments from a plurality of users in association with the currently viewed portion of the electronic document, wherein comments have at least context data indicating a location within the electronic document and content data;

based on at least the currently viewed portion of the electronic document, identifying a next comment or previous comment associated with content of the electronic document outside of the currently viewed portion of the electronic document, and generating and displaying, with the displayed comments in the graphical user interface, a hint comprising a graphical representation of an indication of at least context data and content data of the identified comment;

in response to user input to navigate to displaying a second portion of the electronic document as the currently viewed portion of the electronic document, repeating identifying, based on at least the currently viewed portion of the electronic document, a next or previous comment with respect to the second portion of the electronic document, and generating and displaying a hint of the identified next or previous comment; and in response to an input associated with a displayed hint related to a comment, navigating to displaying, in the document pane, a third portion of the electronic document associated with the comment related to the displayed hint.

16. The computer-implemented process of claim 15, further comprising displaying only comments selected according to filter criteria.

17. The computer-implemented process of claim 15, further comprising generating a comment map providing a spatial representation of distribution of selected comments for the electronic document.

18. The computer-implemented process of claim 17, further comprising, in response to user input with respect to the comment map, navigating to a portion of the electronic document according to the user input.

19. The computer-implemented process of claim 17, in response to user input associated with the comment map, displaying a hint related to comment based on the input associated with the comment map.

20. The computer-implemented process of claim 15, wherein the displayed hint has a first state, and, in response to user input with respect to the displayed hint, generating and displaying the hint in a second state.

* * * * *